US00RE34377E

United States Patent [19]

Wilkins et al.

[11] E Patent Number: Re. 34,377

[45] Reissued Date of Patent: Sep. 14, 1993

[54] ADJUSTABLE STORAGE MODULE

[75] Inventors: Allen L. Wilkins, Verona; Philip F. Hottmann, Cross Plains, both of Wis.; Jerome Caruso, Lake Forest, Ill.

[73] Assignee: Sub-Zero Freezer Co., Inc., Madison, Wis.

[21] Appl. No.: 761,701

[22] Filed: Sep. 18, 1991

Related U.S. Patent Documents

Reissue of:

[64] Patent No.: 4,867,512
Issued: Sep. 19, 1989
Appl. No.: 18,501
Filed: Feb. 25, 1987

[51] Int. Cl.[5] ..... A47B 88/00

[52] U.S. Cl. ..... 312/245; 312/111; 312/333

[58] Field of Search ..... 312/333, 270, 351, 245, 312/246, 138, 332, 111, 350, 128; 211/153; 62/337, 412

[56] References Cited

U.S. PATENT DOCUMENTS

| | | | |
|---|---|---|---|
| 2,769,551 | 11/1956 | Just | 312/333 |
| 3,241,334 | 3/1966 | Amore | 62/412 |
| 3,321,253 | 5/1967 | Everburg | 312/332 |
| 3,339,994 | 9/1967 | Reddig et al. | 312/351 |
| 3,469,711 | 9/1969 | Swaneck et al. | 312/351 |
| 3,471,209 | 10/1969 | Howard | 312/333 |
| 3,647,075 | 3/1972 | Aue | 211/153 |
| 3,658,398 | 4/1972 | Abbate, Jr. et al. | 312/333 |
| 3,680,941 | 8/1972 | Shanks | 312/270 |
| 3,973,814 | 8/1976 | Entrikin | 312/333 |
| 4,172,624 | 10/1979 | Swain | 312/333 |
| 4,172,625 | 10/1979 | Swain | 312/333 |
| 4,231,626 | 11/1980 | Amtmann et al. | 312/245 |
| 4,320,935 | 3/1982 | Nagelkirk | 312/351 |
| 4,408,812 | 10/1983 | Krautwurst | 312/111 |

FOREIGN PATENT DOCUMENTS

| | | | |
|---|---|---|---|
| 2353372 | 5/1974 | Fed. Rep. of Germany | 312/350 |
| 2535040 | 2/1977 | Fed. Rep. of Germany | 312/128 |
| 0434625 | 10/1967 | Switzerland | 312/111 |

*Primary Examiner*—Victor N. Sakran
*Attorney, Agent, or Firm*—Foley & Lardner

[57] ABSTRACT

A storage module for adjustable disposition within a cavity, bounded by opposed side walls, of a refrigerator unit. The module being secured therein by a spaced array of complimentary fixturing projections and fixturing cavities which are oriented angularly upwardly. The fixturing projections and fixturing cavities being arranged for selective mating engagement therebetween and positional restraint of the module in a predetermined location within the cavity. The fixturing projections and fixturing cavities being stabilized by a tribological interface along at least a portion of the mating surfaces between the projections and cavities to restrain the module against dislodgment forces. The projections and cavities are tapered in the plane of movement of the module of each of the projections and cavities including an upper surface disposed at a first angle in the plane and a lower surface disposed at a second angle in the plane.

30 Claims, 6 Drawing Sheets

ADJUSTABLE STORAGE MODULE

Matter enclosed in heavy brackets [ ] appears in the original patent but forms no part of this reissue specification; matter printed in italics indicates the additions made by reissue.

TECHNICAL FIELD

The present invention relates, generally, to adjustable storage modules and, more particularly, a storage module for adjustable disposition within a refrigeration unit. The present invention is most particularly concerned with adjustable modules for storing food items in a household refrigerator in either a generally closed configuration wherein access is had by means of doors or the like or an open shelf-like configuration.

BACKGROUND OF THE INVENTION

Household refrigerators have evolved considerably over the years since their introduction and are now rather commonplace domestic appliances. Apart from the great strides made in the preservation of foodstuffs or perishable comestibles, the design of a household refrigerator is impelled by many other functional attributes given the nature of the environment in which these appliances are used. Several such design considerations include maintenance of the refrigerator, and particularly within the refrigerated cavity thereof, and the adaptability of the refrigerator to the culinary lifestyles and vagaries thereof exhibited by the user of the refrigerator. More specifically, it is important that the user be able to arrange the interior space of a refrigerator to accommodate the range of items placed therein with due regard for size and shape of certain food articles or demands for controlled environments as may be required by various types of fresh food. Organizational versatility also augments the ability to clean the interior space of a refrigerator provided a full range of adjustability finds it way into the design. This permits the user either to remove components such as shelves or storage compartments to facilitate organization, or perhaps take advantage of other ranges of adjustability, in order to clean around or about the otherwise structural components.

Refrigerator design, and particularly that for domestic refrigerators, has long been concerned with the ability to provide the objectives briefly noted above. Removable shelves have been proposed as have removable or adjustable compartments. For example, U.S. Pat. Nos. 3,647,075 and 3,469,711 relate to adjustable storage shelves for association with a refrigerator door. The door is formed with a central cavity defined between outwardly projecting side walls. Standards or so-called stringer members are secured to the outer face of the outwardly projecting side walls and are themselves formed with a linear series of generally rectangular apertures to define fixturing locations vertically along the length of the refrigerator door. The cooperative shelf member has a generally L-shaped profile in cross section with side walls formed as return legs of the front face to give the shelf an overall conformity in the shape of a "U". The side walls or the free legs of that "U" include hook-like elements configured specifically for disposition within selected rectangular apertures in the stringer members. In this fashion the shelf may be placed at any convenient location along the door with the long leg of the "L" member inserted intermediate the outwardly projecting side walls of the door, with the hook-like elements engaging the selected apertures. When located at a convenient height or otherwise disposed in a convenient location for the user, food items or the like may be carried on the shelf and confined to that region by the front face and the door itself. The '711 patent discloses a conceptually identical approach, but one where the shelf is of a more complicated manufacturing design.

Similar adjustable compartments or shelving members have been proposed for use within the main fresh food cavity of a household refrigerator. For example, U.S. Pat. No. 3,680,941 discloses a food storage compartment for a refrigerator in which an assembly comprised of standards and brackets is adapted for locating a storage drawer. Vertical standards like those described with regard to the '075 patent are affixed to the rear wall of a refrigerator. A drawer is disposed within a generally rectilinear housing from which it may be withdrawn to provide access to its interior and whatever comestibles may be stored therein. The outer frame within which the drawer slides is supported on either side by a bracket having hook-like elements at the rear terminus thereof specifically configured for internal cooperation within the array of slots formed in the standard. Accordingly, the drawer may be moved about the interior of the refrigerator within the zone defined by the standards at the will of the user.

Somewhat more versatile are the adjustable storage compartments disclosed in U.S. Pat. Nos. 3,241,334 and 3,339,994. In each instance a storage compartment is associated dependently with a conventional wire rack within the refrigerator, the type of racks historically used as shelving members to allow free flow of circulating air throughout the refrigerated cavity. Each of the '334 and '994 patents provide a plate which is supported upon the wire rack. The plate is formed with downwardly projecting flanges which are placed at opposed edges and dimensioned to project beneath the rack or wire shelf. The flanges include return legs or shoulders which form a guideway for an associated flange on a storage unit so that the storage unit, for example a drawer, may be positioned beneath the wire shelf for movement into and out of the refrigerator cavity. Positioning that moveable/removeable drawer is achieved simply by placement of the upper supporting panel at a convenient or desired location by the user.

The devices described in summary above undoubtedly work well for their intended applications, but suffer one or more drawbacks. Standards and brackets as a design for achieving adjustability are attended by certain structural problems. For example, as the cantilevered bracket elements are loaded a moment is created about the juncture of these two elements. Increasing the loading compounds associated problems at that juncture and, although structurally the assembly remains static, the resolution of forces tend to approach point-like concentration. Depending upon the design, and whether one is concerned with a cantilevered shelf versus a cantilevered drawer, there may be more or less tendency toward rattling as the refrigerator is opened or closed or as a consequence of vibration in the structure due to, e.g., compressors or the like. None of these structures is truly adequate to protect the integrity of the module and the items it supports when a refrigerator door is closed abruptly or slammed shut. Furthermore, none of the approaches heretofore proposed fully accommodates the requirements of the user in terms of cleaning the interior space of the refrigerator and particularly at or around the adjustable module(s). Individual wires, prongs, apertured or fenestrated channels are all locations where debris can collect and yet be difficult to remove without resorting to elaborate or painstaking efforts. Accordingly, it is apparent that the need yet exists to provide an improved storage module for adjustable disposition within the cavity of a refrigerator, whether the door or main cavity thereof, which may be positioned at the desires of a user to facilitate interior organization, which cooperates with the refrigerator structure under all manner and variety of loading conditions, and which also either facilitates the ability to clean the interior of the refrigerator or, at the least, does not hinder that objective.

SUMMARY OF THE INVENTION

The present invention responds to the needs heretofore unmet by the prior art. An adjustable storage module of the present invention may be configured in either a closed compartment design wherein access is achieved through moveable doors in an open shelf design for receipt and retention of food items or the like. The module, regardless of specific environmental configuration, is associated operatively with a refrigerator, and advantageously with the door of a refrigerator, in a way which increases the retaining forces which maintain the module in place with increasing loads on that module. The storage module of the present invention is, accordingly, statically and dynamically integrated within the refrigerator door or cavity. The storage module is easily removed for movement to a new location within the refrigeration unit and thereby fostering a wide range of organizational adjustability or for removal to permit thorough and adequate cleaning of the refrigerator including all of the associated components.

The foregoing, and other advantages of the present invention, are realized in one aspect thereof by a storage module configured for disposition within a cavity, bounded by opposed side walls, of a refrigeration unit, wherein the module is secured by fixturing means comprised of a spaced array of complementary fixturing projections and fixturing cavities having mating geometries. Projections are formed either on the module, at opposed end walls thereof, or on the side walls defining the transverse dimensions of the cavity; fixturing cavities are formed on the other of these elements. The two are disposed for selective mating engagement therebetween to establish positional restraint of the module in a predetermined location within the cavity. Accordingly, in the most preferred implementation, the fixturing projections associated with the refrigeration unit will be in a vertical array and, most preferably, a vertical array of fixturing projections for cooperation with fixturing cavities formed in the opposed end walls of the storage module. Stabilizing means are included for creating a tribological interface along at least a portion of the mating surfaces between the projections and cavities to augment structural forces in operation between those same elements. In this fashion the storage module is firmly and positively received at the desired location and is maintained thereat in the face of normally anticipated operating forces or impulses as may be experienced when a refrigerator door is slammed. Indeed, the storage module of the present invention is designed to respond with increasing positional or restraining forces as potential dislodgement forces themselves rise.

In a highly preferred form of the present invention, the projections and cavities are tapered in the plane of movement of the module within the refrigeration cavity and are oriented angularly upwardly therein. Each of these projections and cavities includes an upper surface disposed at a first angle in that plane and a lower surface disposed at a second angle in that plane. Preferably the two angles are offset by a value of up to about 10°; most preferably the angular difference is approximately 2°. Thus, with the module positioned at a desirable location, increasing loads on it tend to wedge the projections and cavities into closer cooperation.

The stabilizing means is most preferably comprised of a discrete stabilizing element which has a coefficient of friction relative to the surfaces of the projections and cavities greater than the coefficient of friction otherwise existing between those mating surfaces. Most preferably, the stabilizing element is an elastomeric element fitted at a desired location along the interface between projections and cavities. Most preferably, the stabilizing element is located along the upper surface of a cavity to contact the mating projection. Due to the upward angular orientation of the fixturing members, once again the added loading or increased weight placed within the adjustable module will increase the frictional force at the tribological interface.

In one variation of the present invention, the storage module is a segmented compartment into which access is gained via doors pivotally disposed for movement along a top edge. This embodiment is most preferably designed for use as a dairy storage compartment, and enjoys positive sealing members in cooperation with the doors to establish the proper environment for foodstuffs placed in the compartment. In this implementation, there are preferably two stabilizing elements, one associated with an upper fixturing combination and the other with a lower fixturing combination. The upper element functions exactly in the manner described immediately above; the lower stabilizing element is configured to provide additional restraint against dislodgement or movement of the module when the doors are opened from their free bottom edge about the pivotal top edge.

The storage modules of the present invention are advantageously fabricated from molded polymeric materials, most preferably ABS copolymer for the main structure elements and a polycarbonate for face members so that some measure of transparency or translucency is provided. The molded members are designed specifically to provide positive mechanical interlock among the individual members constituting the overall assembly. This facilitates manufacturing and also maintains the unit as one of high structural integrity when in use.

Several ancillary features for user convenience or aesthetics are provided as part of the storage modules of the present invention. For example, drip shields or dams are included at appropriate locations within the storage module to retard the flow of spilled liquids which would otherwise drip from the module. Translucent panel members are provided with visual relief means for reducing the perception of scratches or marring which are likely to occur even under normal use. Likewise, shelf members are formed with slightly arcuate ribs or longitudinal bosses to support food items from the bottom of that shelf.

Other advantages of the present invention, and fuller appreciation of its construction and mode of operation, will be gained upon an examination of the following detailed description of preferred embodiments, taken in conjunction with the figures of drawing.

DETAILED DESCRIPTION OF PREFERRED EMBODIMENTS

Figure 1:
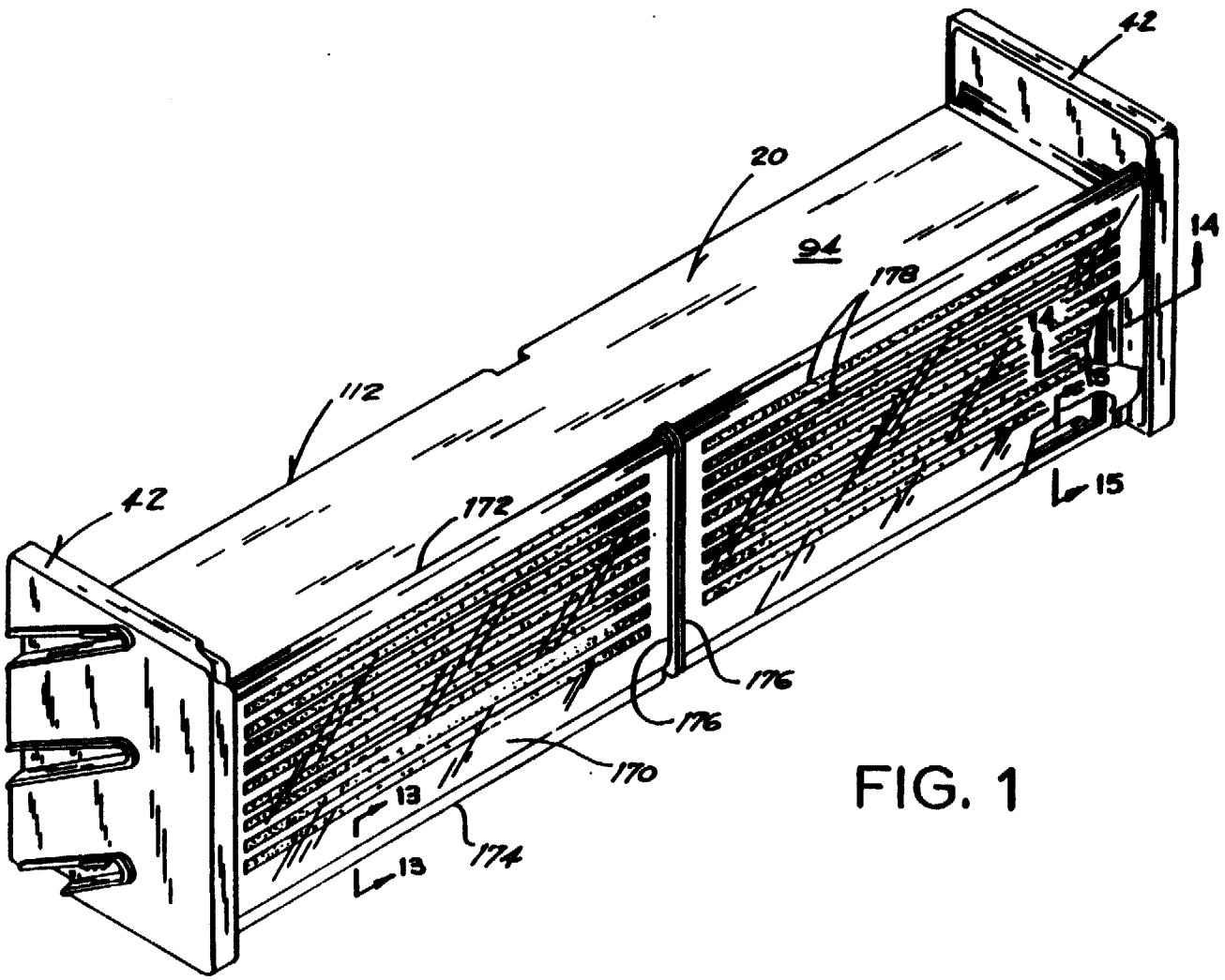
FIG. 1 is an isometric view showing a storage module in accordance with the present invention, here illustrated as an adjustable dairy compartment or the like for association in a refrigerator door.

The present invention relates, generally, to adjustable storage modules and, more particularly, to an adjustable storage shelf or storage compartment for use in a refrigerator such as a conventional household refrigerator. Accordingly, the present invention will now be described with reference to certain preferred embodiments in the foregoing contexts; albeit, those skilled in the art will appreciate that such a description is meant to be exemplary only and should not be deemed limitative on the scope of this invention.

Turning to the figures of drawing, in each of which like parts are identified with like reference numerals, a storage module in accordance with the present invention, designated generally as 20 is shown for adjustable disposition within a cavity of a refrigerator (not shown) in order that the module may be placed at any convenient location so suit the needs of the user. The refrigerator cavity is defined between opposed side walls, designated generally as 22 and best visualized with reference to FIG. 2. The side walls 22 are comprised of an interior face 24 which merges outwardly from a rear wall 26, the two merging at a rounded corner 28. The side wall 22 also includes an outer face 30 joined to the inner face at a circular return 32. An identical, but mirror image, construction comprises the opposed side wall 22 which defines the cavity identified generally as 34, which has been omitted from the drawing for the sake of clarity. Regardless, the cavity has a width dimension coextensive with the width of the rear wall 26, a depth dimension governed by the projection of the side wall 22 outwardly from the rear wall, and a height dimension which may be all or a desirable portion of the height of the refrigerator door within which the cavity is confined. In a very analogous fashion, the cavity of interest could as easily be established within the main refrigerator cavity of the fresh food compartment, or even the freezer compartment, of a refrigerator. As shall be seen, therefore, the adjustable module 20 is specifically designed for placement within a cavity of the refrigerator, wherever located, to present the user with organizational adjustability and convenience of operation.

Figure 2:
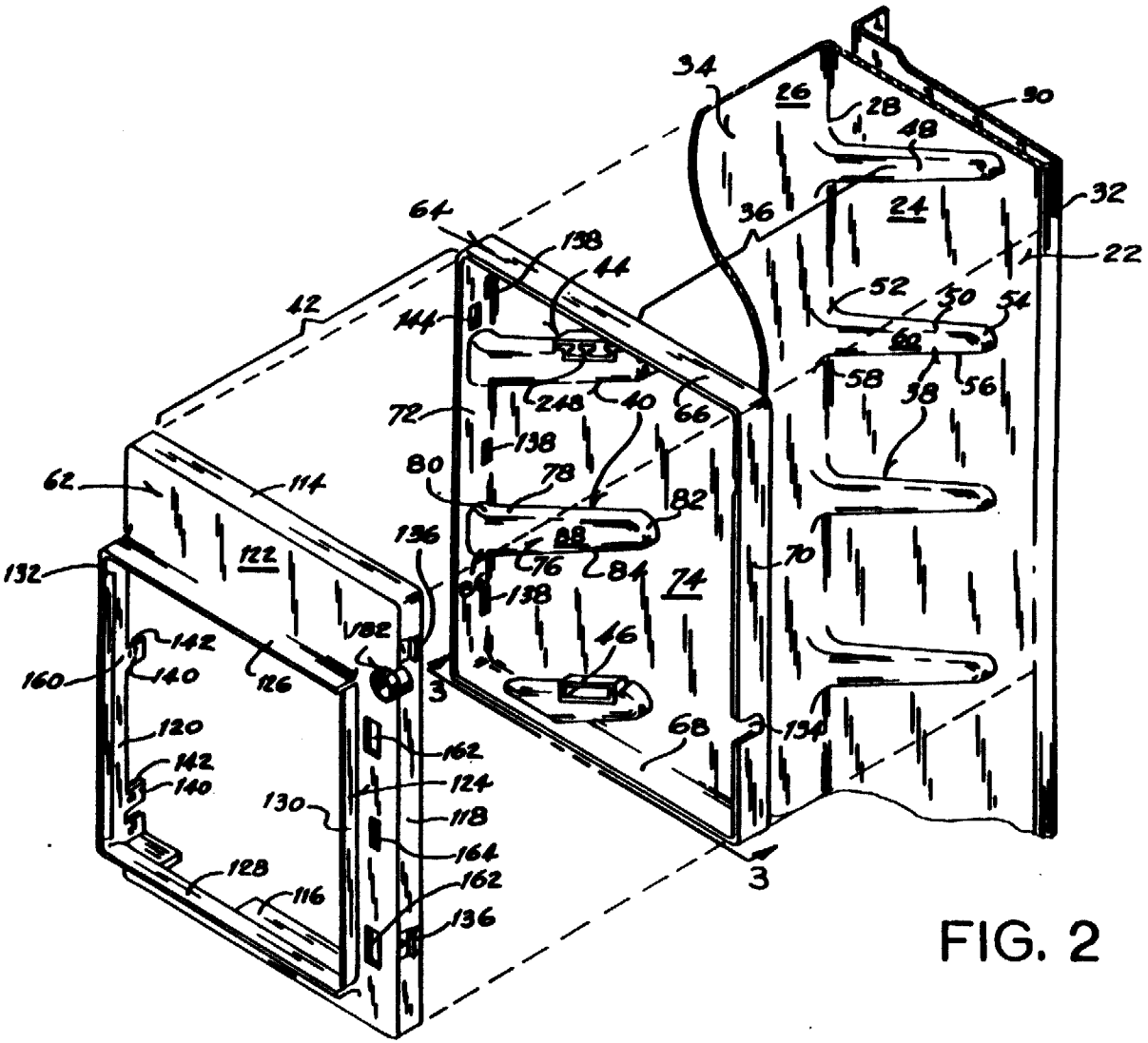
FIG. 2 is an exploded, isometric view of the right end wall assembly of the storage module of FIG. 1, shown in cooperation with a fragmentary element of the refrigerator door within which that module is disposed.
Figure 3:
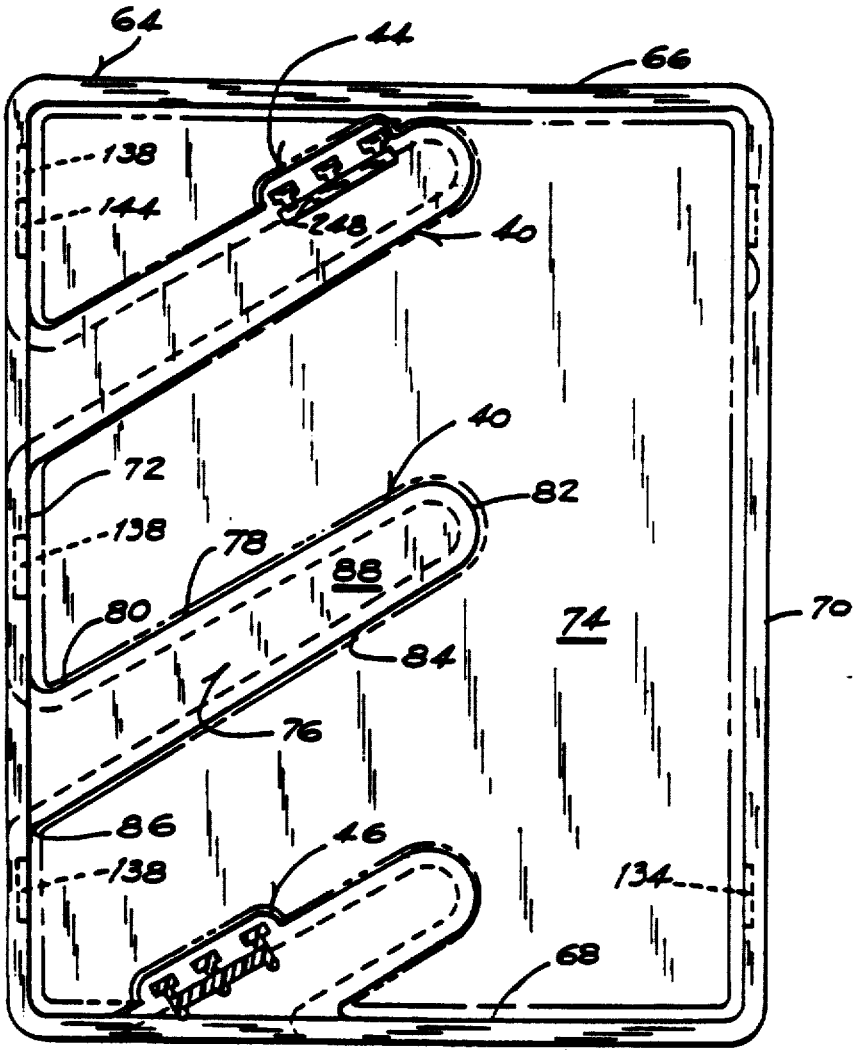
FIG. 3 is an end elevation view of the end wall of the storage module of FIG. 1.

Module 20 is secured to the refrigerator within the cavity by fixturing means identified generally as 36. These fixturing means are comprised of a spaced array of equidistantly spaced fixturing projections identified generally as 38 and similarly spaced fixturing cavities identified generally as 40, as best viewed in FIG. 2. In the preferred form shown, the fixturing projections 38 are formed as raised elements from the interior face 24 of the side wall 22, whereas the fixturing cavities 40 are defined as recesses within end wall assemblies 42 of the storage module 20. The orientation of projections and cavities may be reversed at the option of the designer without departing from the fundamental spirit of this invention, however, it has been determined that this relationship is most preferred for both manufacturing and operational efficiencies. Irrespectively, the fixturing means 36 are formed in mating arrays so that the elements associated with the module 20 permit its placement within the cavity 34 at a desired location by selectively matching projections and cavities at the proper location. Stabilizing means, identified generally as 44 and 46 in FIG. 2, are provided to create a tribological interface along at least a portion of the mating surfaces between the fixturing projections 38 and fixturing cavities 40 which further restrains the module against dislodgement forces from the door as will be described more fully herein below. The stabilizing means 44 and 46 here are shown in the preferred form of discrete elements, although that is not a requirement of the instant structure. The tribological interface between mating fixturing projections 38 and fixturing cavities 40 may constitute the entirety of the mating surface area as, for example, would be achieved by disposing a film or tape-like member between the cooperative elements. However, it has been determined that the discrete stabilizing elements are fully functional for the intended purpose of maintaining stability or operational restraint of the module both under static and dynamic conditions.

The fixturing projections 38 are formed in the aforenoted vertical array within the side wall 22 of the refrigerator door. In the preferred form shown, each of these projections is in the specific form of a rib 48 raised from the face 24 of the side wall 22 and the rear wall 26 proximate the rounded corner 28. Thus, each rib 48 includes a top face 50 flaring from the rear wall 26 at a juncture 52, an arcuate return face 54 and a bottom face 56 likewise flaring from the rear wall, although from a juncture 58. The overall profile is completed with a side face 60. Each of the mating fixturing cavities 40 has an entirely complementary geometry, which is conveniently envisioned from the rear in FIG. 2. In this instance, the end wall assembly 42 is comprised of an inner end wall panel 62 and outer end wall panel 64, the fixturing cavities 40 most preferably being formed in the latter only. The end wall panel 64 is shown in the form of a generally rectilinear panel having top and bottom faces 66 and 68 respectively, side panels 70 and 72 and an end face 74. Each of the fixturing cavities 40 is shown in the specific form of a recessed call 76 comprised of a top face 78 flaring into the side face 72 at a juncture 80, a return face 82 which merges to a bottom face 84 which likewise is joined to the side wall 72, but here at a juncture 86. A cell face wall 88 completes the contours of the cell 76 which meets with the respective rib 60.

Both the ribs 60 and the cells 76 are generally tapered fixturing means with an upward angular orientation in the plane of movement of the module within the refrigerator cavity 34. Thus, the fixturing means tend to wedge together when the module 20 is disposed within the cavity, a feature of the invention considered in greater detail below. The wedging action, which contributes to enhanced operational stability, is augmented further by a highly preferred angular orientation of these fixturing means More specifically, each of the upper and lower faces of each of the ribs and cells is seen to lie at an angle with respect to a horizontal reference. In other words, the upper face of, e.g., a rib (i.e., face 50) defines a first angle with the horizontal in the plane of movement of the mating ribs and cells whereas the bottom face (i.e., 56) defines a second angle in that same regard. It is preferred that the two angles be different and that they be different by an amount of up to about 10°. More preferred is an angular deviation of about 2°, where the slope or first angle, corresponding to the upper face, is at a lesser angle than the slope of the bottom face. Most preferred is a slope angle of the top wall 50 of about 30° with a slope angle of the bottom face 56 of approximately 32°. This angular mismatch tends to intensify the wedging action of the cells with the ribs further contributing to a positive yet easily releasable interfit between the module 20 and the refrigerator door.

Figure 4:
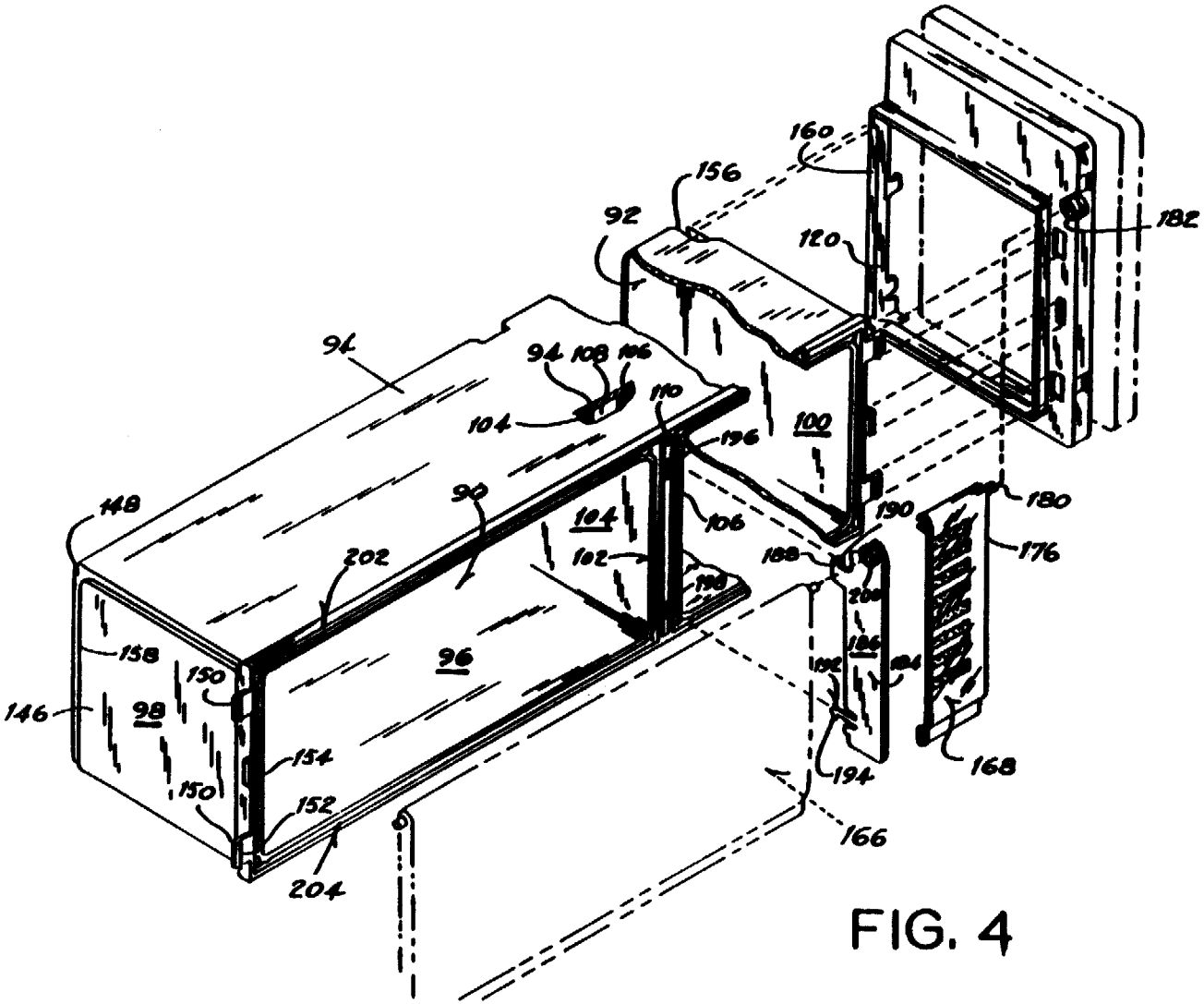
FIG. 4 is an exploded, fragmentary view illustrating the components of the storage module of FIG. 1.

The preferred form of storage module 20 illustrated in FIGS. 1–4 is a segmented unit having two storage compartments 90 and 92, as best viewed in FIG. 4. The module 20 is comprised of a top wall 94, a bottom wall 96 and opposed end walls 98 and 100. A partition designated generally as 102 is shown in the illustrated embodiment, comprising means for dividing the interior of the module into the two compartments 90 and 92 as noted above. This partition 102 thus provides a first interior end wall 104 to define the interior of the compartment 90 and similar interior end wall 106 for defining the compartment 92. In the preferred form shown, the two interior walls 104 and 106 are spaced one from another to yield a channel or recess 108, open from the rear of the module 20 and enclosed by a panel 110 along the front face of the unit. The body of the module thus defined by these wall components, designated generally as 112, is supported at either end thereof by the end wall assemblies 42. In turn, each end wall assembly is formed from inner and outer end wall panels 62 and 64, the former of which has briefly been described with reference to the associated cells 76. The inner end wall panel 62 has the same generally rectilinear configuration as that of the outer panel member 64. Thus, it is comprised of top and bottom walls 114 and 116 and opposed side walls 118 and 120. The panel 62 further includes a face 122 from which projects a generally rectangular flange 124. The flange includes upper and lower flange walls 126 and 128, respectively, and inside flange walls 130 and 132. The two panels 62 and 64 are dimensioned to cooperate in a nested relationship, wherein the walls 114–120 of the inner panel 62 fit within the inner contour of the walls 66–72 of the outer end wall panel member 64. The two are firmly restrained by mechanical interlocking means in that unitary configuration. More particularly, the side face 70 of the panel member 64 is formed with a pair of locating apertures 134, one of which is best seen in FIG. 2. The locating apertures are preferably blind recesses formed proximate the juncture of the side face 70 with the end face 74. Upper and lower cooperative locating tabs 136 are formed on the side face 118 of the panel 62 and are configured to interfit within the blind locating recesses 134. On the opposed side face 72, there are a plurality of snap recesses 138 formed proximate its juncture with the front face 74, then once again most preferably being blind recesses. The side wall 120 includes a plurality of snap tabs 140, two of which are shown in FIG. 2. These tabs project outwardly from the edge of the wall, each terminating in a hook-like member 142 having a reentrant geometry. The tabs 140 are sized to create an effective hinge along the juncture of the tab with the side wall 120, allowing the tab to swing inwardly with the tip of the hook-like member 142 riding across the face 72 during assembly of these components. That assembly is achieved by disposing the locating tabs 136 in the cooperative apertures or recesses 134 and then applying a compressive force to the flange 124, forcing the tabs 140 to move inwardly until the reentrant hook registers with the cooperative recess 138. At that time the natural resiliency of the tabs returns them to their normal configuration with the reentrant hooks now lodged firmly in the recesses. An aperture, such as aperture 144 shown in FIG. 2, is provided to assist in the disassembly of this end wall combination, allowing for the introduction of a screwdriver blade or similar instrument which can be used to pry the face or wall 72 slightly away from the mating face 120, releasing the hooks from the recesses and allowing the panel 62 to pivot away from the panel 64 about the cooperating tabs and recesses at the opposed side.

Once the end wall assembly 42 is formed into its final configuration it is itself mechanically interfitted to the appropriate end of the body 112 comprising the module 20. The end wall 98 extends outwardly slightly within a central region to yield a raised region 146 surrounded by a margin 148. The end wall 98 further includes a pair of snap tabs 150 having the same general configuration as the tabs 140 described in detail above. Thus, they include a fin terminating in a hook 152 having a generally reentrant geometry. A somewhat blunt locating tab 154, having a lower profile than the snap tabs 150 is formed generally intermediate their disposition across the face 98. Opposite those tabs 150 and 154, on the raised central region 146, a groove 156 undercuts the edge 158 as best shown in FIG. 4. A cooperative tab 160 is formed principally along the length of the inner side of the flange side wall 132. The tab 160 is raised and includes a slightly reentrant geometry for close cooperation within the groove 156. Proximate the opposed side flange wall 130, a plurality of rectilinear apertures is formed; upper and lower apertures 162 are dimensioned and positioned for cooperation with the snap tabs 150, while the central aperture 164 is positioned for mating cooperation with the locating tab 154. As can now be readily visualized, the end panel assembly 42 is easily associated with the body 112 by first disposing the tab 160 within its mating groove 156 and thence rotating or pivoting the assembly toward the end wall 98, forcing the snap tabs 150 through the apertures 162 and the locating tab 154 into its cooperative aperture 164. At that time the resilience of the tabs and reentrant hook elements 152 thereon firmly restrain the end wall assembly to the body of the module.

The adjustable storage module 20 as principally illustrated in these preferred embodiments, is a closed, multi-compartment storage unit adapted for housing such sundry comestibles as dairy products. Accordingly, each of the compartments 90 and 92 is provided with an outer door, identified generally as 166 and 168 for those compartments, respectively. Each of the doors 166 and 168 is designed as a rectilinear panel having a dimension sufficient to close the opening of the respective compartment. More specifically, each of the doors is formed with a central panel 170 bounded by top and bottom edges 172 and 174, respectively; opposed side edges 176 complete the overall geometry. In this case, the door is a fairly thin panel of molded polycarbonate to provide a relatively transparent panel through which the user may view the contents of the dairy compartments. A plurality of transverse etch lines 178 are provided across the transparent panel to provide visual relief and obscure mars of scratches which will naturally arise during use.

The doors 166 and 168 are disposed in hinged relationship to the body 112 for upwardly pivotal movement about a hinge line generally coincident with the top edge 172. This arrangement is achieved by molding a pair of opposed hinge pins 180 at the upper corners of each of the panels 170, these pins projecting slightly outwardly from the side edges 176. Each of the end wall assemblies 42 is molded to include a hinge recess, identified generally as 182, having a circular geometry to cooperate with the hinge pins 180. In this instance, an annular boss projects somewhat outwardly of the face 122 of the inner panel member 62. Those hinge recesses or bosses 182 accommodate the exterior hinge pins 180. A hinge insert, identified generally as 184 is disposed in cooperation with the front panel 110 intermediate the two compartments 90 and 92. More specifically, the hinge insert 184 is in the form of a relatively thin web 186 having a length generally equal to the height of the body 112. An upper, generally U-shaped flange 188 extends from the edge of the web 186, defining a generally U-shaped channel 190. A lower tab 192 also extends outwardly of the web 186, this tab terminating in a reentrant hook 194. Upper and lower apertures 196 and 198 are provided in the panel 110 for cooperation with the flange 188 and tab 192. More specifically, the upper end of the web 186 is urged into engagement with the panel 110 by disposing the flange 188 through aperture 196 such that the wall member nestles within the channel 190. The tab 192 is thence inserted through the aperture 198, hinging the tab member upwardly until it passes through the thickness of the panel 110 at which time the hook engages the rear side of that panel to affix the insert 184 to the body 112. That insert is shown to include a pair of hinge recesses 200 which now provide the remaining structure necessary for pivotal disposition of the doors 166 and 168 about the body 112.

The doors which close the compartments are most preferably sealed in the normal configuration. It is preferred that the side and upper margins of the door be sealed with a generally conventional bellows type seal, identified generally as 202. Contrariwise, the lower edge of he door is preferably sealed by a magnetic sealing strip identified generally as 204. These seals are shown in considerable detail in FIGS. 14 and 15. More specifically, the seal 202 is comprised of a rib 206 having a hook like projection 208 at its distal end. This rib and associated hook are configured for disposition within a groove surrounding the open portion of the compartment (not shown) for positioning the seal 202 properly. A first plenum 210 is adjacent to the rib 206, defined within enveloping flexible walls 212. This plenum and the flexibility of the walls 212 allow the principal sealing element 214 to move slightly and assume the most beneficial orientation when contacted by the door with which it is associated. This element 214 is itself comprised of a plenum 216 surrounded by a distensible wall 218. When the door contacts the seal 202 it compresses the top face of wall 218 compressing the head 214 of the seal to ensure positive contact with the door.

Figures 5, 6, 7, 8, 9, 10, 11, 12, 13, 14, 15:
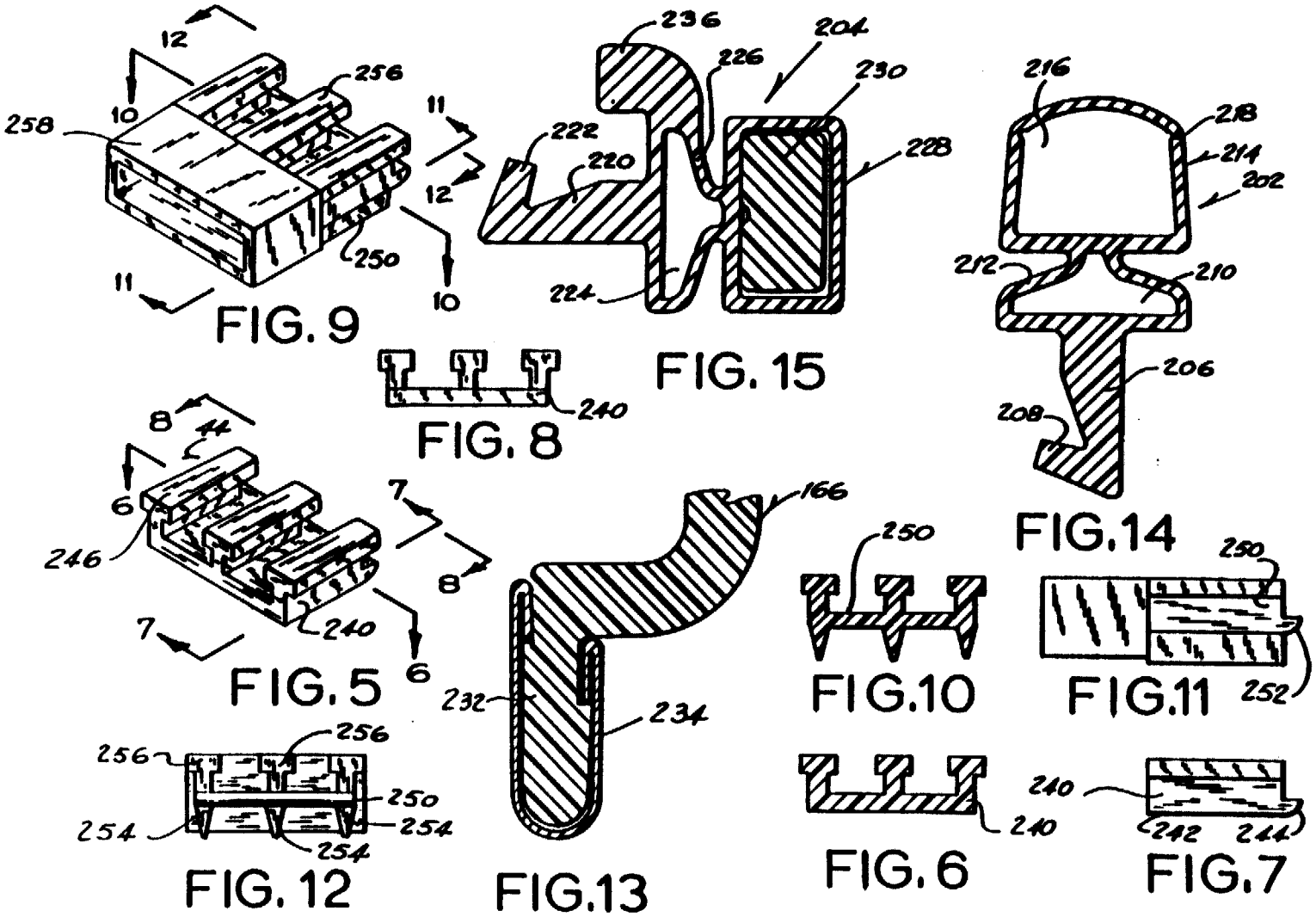
FIG. 5 is an isometric view of a stabilizing element used in a storage module in accordance with the present invention.
FIG. 6 is a sectional view, taken substantially along the line 6—6 of FIG. 5.
FIG. 7 is an end elevation view showing the stabilizing element illustrated in FIG. 5.
FIG. 8 is a side elevation view of the stabilizing element of FIG. 5.
FIG. 9 is an isometric view showing a different variety of stabilizing element also used in conjunction with the storage module of the present invention, such as the storage module of FIG. 1.
FIG. 10 is a sectional view, taken substantially along the line 10—10 of FIG. 9.
FIG. 11 is an end elevation view of the stabilizing element of FIG. 9.
FIG. 12 is a side elevation view of the stabilizing element of FIG. 9.
FIG. 13 is a sectional view, taken substantially along the line 13—13 of FIG. 1, here showing the free edge of the door providing access to the interior of that storage module.
FIG. 14 is a sectional view, taken substantially along the line 14—14 of FIG. 1, illustrating here the side seal element for the moveable door.
FIG. 15 is a sectional view, taken substantially along the line 15—15 of FIG. 1, in this instance showing a seal for the lower edge of the access door for that module.

The seal 204, best viewed in detail in FIG. 15, extends along the bottom edge of the compartments for contact with the door in a sealing relationship. The seal 204, like 202, includes a rib 220 for captured receipt of the seal within a groove of the module body. A plenum 224 is defined by distensible walls 226 for the same function as the corresponding plenum 210. However, the head of the seal, designated generally as 228, has a channel filled with magnetic material 230. The material 230 is preferably a somewhat resilient material loaded with a permanently magnetic material to create a magnetic field proximate the head 228. The lower edge of the door, such as the door 166 as viewed in FIG. 13, is formed with an inwardly offset leg 232. The offset leg 232 supports a strip of magnetically susceptible material 234, associated in close conformity with the leg, preferably configured for an interference fit of the leg 232 within the bight of the generally U-shaped clip. Most preferably, the clip 234 is fabricated from magnetically susceptible stainless steel to maintain an attractive appearance. Regardless, when the door is in its normally closed position, the magnetic strip 230 will capture the clip 234 and maintain a positive seal about the doorway closing the respective compartment.

A curvilinear rib 236 extends outward from the junction of distensible walls 226 and rib 220. When seal 204 is installed on the module body, curvilinear rib 236 engages the bottom edge of the compartments 90 and 92, and extends slightly into the interior thereof, forming a lip extending laterally across the bottom surface of compartments 90 and 92. That lip prevents spilled liquids from leaking from the interior of the compartment and provides the further advantage of acting as a stop, preventing articles from sliding out of the compartment if the refrigerator door is slammed or jarred.

With the module 20 assembled in accordance with the foregoing detailed description, it is ready for adjustable disposition within the refrigerator. That is achieved by appropriately selecting the raised ribs on the door panel corresponding to the height at which the user wishes to place the module. Thence, the module is fitted into the cavity such that those raised ribs project within the cells 40. When ready for use, the module can receive food items or the like within the compartments by opening the doors for access. There are, under the circumstances, three sources of force which must be accommodated when the module 20 is in use: there is generally downward force on the body 112 exerted by the weight of the contents of the module, tending to be a generally linear, downward force but with the potential for a slight rotational component resolved about a moment arm centered along the bottom rear edge of the body 112; a rotational force is experienced when the doors are opened, that force having a moment arm pivoting about the upper rear edge of the body; and there will be impulse-type forces experienced by the module when the refrigerator door is slammed or the refrigerator otherwise jarred. These impulse-type forces will not necessarily have any particular orientation, but the same tend to raise the module 20 out of engagement with the door and thus constitute dislodgement forces in general. Notwithstanding the presence of such forces, the module 20 is maintained in a stable configuration, in part by the stabilizing means 44 and 46 noted briefly above in conjunction with the overall structural design.

The first stabilizing means 44 is principally concerned with the creation of interfacial interference or a tribological interface in a frictional sense to retard dislodgement forces which would tend to displace the module during use. In this regard, the stabilizing means 44 is most preferably positioned along a top or superior interface such that the weight of the module and similar downwardly oriented forces will increase the retarding frictional force along the interface, proportionately giving a higher force where the dislodging forces are themselves rising. This is achieved in the preferred embodiment by an elastomeric element best viewed in FIGS. 5–8.

The stabilizing element 44 is comprised of a main interfacial web 240 which is disposed for contact with the upper face 50 of a rib 48 from a position associated with the upper face 78 of the mating cell. The insert 44, preferably an elastomeric material, has a smooth face which contacts the surface of the rib. Insofar as the geometry of these cells within which the insert is disposed tends to be somewhat arcuate, that face 242 terminates in a slightly arcuate lip 244 in order to ensure a smooth interface is provided between the stabilizing element 44 and the associated rib. A plurality of generally T-shaped flanges 246 are formed upwardly from the web 240. A geometrically complementary aperture 248 is formed in the cell wall which receives the insert 44 such that it may be simply disposed from the rear side of the panel member 64 and presents itself for contact with the rib 48. Most preferably, the insert 44 is disposed near the terminus (i.e.; 54) of the cell along the upper most of the fixturing cavities of the module 20.

The lower stabilizing element 46 is of conceptually similar design, as best viewed in FIGS. 9–12. It includes a web 250, likewise terminating in a slightly arcuate lip 252 in order to match the curved geometry of the cell with which it is associated. The web in this embodiment, however, does not directly contact the interface between the rib and cell; rather a plurality of transverse ribs 254 depend downwardly from the web 250 to engage that interface. T-shaped flanges 256 extend upwardly from the web 250 for the same purpose as the flanges 246, helping to secure the element 46 as an insert in the upper face of the associated cell wall as best seen in FIG. 2. The stabilizing element 46 yet further includes a rearwardly directed flange 258 which defines an interior recess. The flange 258 is specifically dimensioned to abut the end wall 98 when the assembly is complete, adding some positional stability to this element. The stabilizing member 46 is, like the upper stabilizing member 44, preferably disposed along the top edge or in association with the top face of its cell. However, unlike the former, the stabilizing element 46 is disposed proximate the open throat of that cell as best viewed in FIG. 3. This stabilizing element is provided to retard dislodgement forces which arise when the doors 166 and 168 are opened. During the opening of those doors, forces are transmitted in a somewhat rotational sense and those forces are resisted by the transverse ribs 254 disposed laterally across the face of the cooperative rib 48. Thus, in combination with the element, 44, it provides added stability to the structure; collectively, the stabilizing means resist dislodgement forces normally encountered in the use of a household refrigerator.

In another variation of the present invention, the adjustable module is a storage shelf compatible with the mounting system described above. According to this embodiment, best viewed in FIG. 16, a body 260 spans the width of cavity 34. Body 260 is a molded, single piece member having a generally "L"-shaped cross section. Body 260 includes a front face 262 having frosted stripes 264 etched longitudinally thereon which visually obscure scratches or other marks which accumulate on front face 262 even during normal use. Body 260 further includes a generally planar shelf portion 266 having a plurality of arcuate elements 268 raised from the surface thereof and extending lengthwise across a planar shelf portion 266. Arcuate elements 268 support items slightly above the planar surface of shelf 266 and are advantageously employed to prevent scratches and the like from marring the planar surface of shelf portion 266. The front face and generally planar shelf portion 266 merge at rounded corner 270. A top lip 272 extends laterally across body 260 and merges with front face 262 at rounded corner 274. The body of the module thus defined by front face 262, planar shelf 266, and top lip 272 is supported at either end by end wall assemblies 276 and 278 (also sometimes referred to herein as "end cap assemblies"). In turn, the end wall assemblies 276 and 278 are formed from inner and outer end wall panels 280 and 282 and 284 and 286, respectively. The attachment of each end wall assembly to body 260 is identical, with both end cap assemblies being mirror images of the other. Therefore, for the sake of simplicity, only the construction of end cap assembly 276 is discussed in detail herein.

The inner end wall panel 280 has the same type of generally rectilinear configuration as that of outer end wall member 282. Thus, it is comprised of top and bottom walls 288 and 290 and a side wall 292. The two panels 280 and 282 are dimensioned to cooperate in a nested relationship, wherein the walls 288 and 290 of the inner panel 280 fit within the inner contour of walls 294 and 296 of outer end panel member 282. The two are firmly restrained by mechanical interlocking means in that unitary configuration. More particularly, the side face 298 is formed with a pair of locating detents 300 which are preferably blind recesses formed proximate the juncture of the side face 298 and side edge 302. Upper and lower snap tabs 304 project outwardly from side edge 302 and terminate in a hook-like member 306 having a reentrant geometry. The tabs 304 are sized to be effectively hinged along the juncture of the tab with the side edge 302 allowing the tab to swing inwardly with the tip of the hook-like member 306 riding across the face 298 during assembly of these components.

Figures 16, 17, 18, 19:
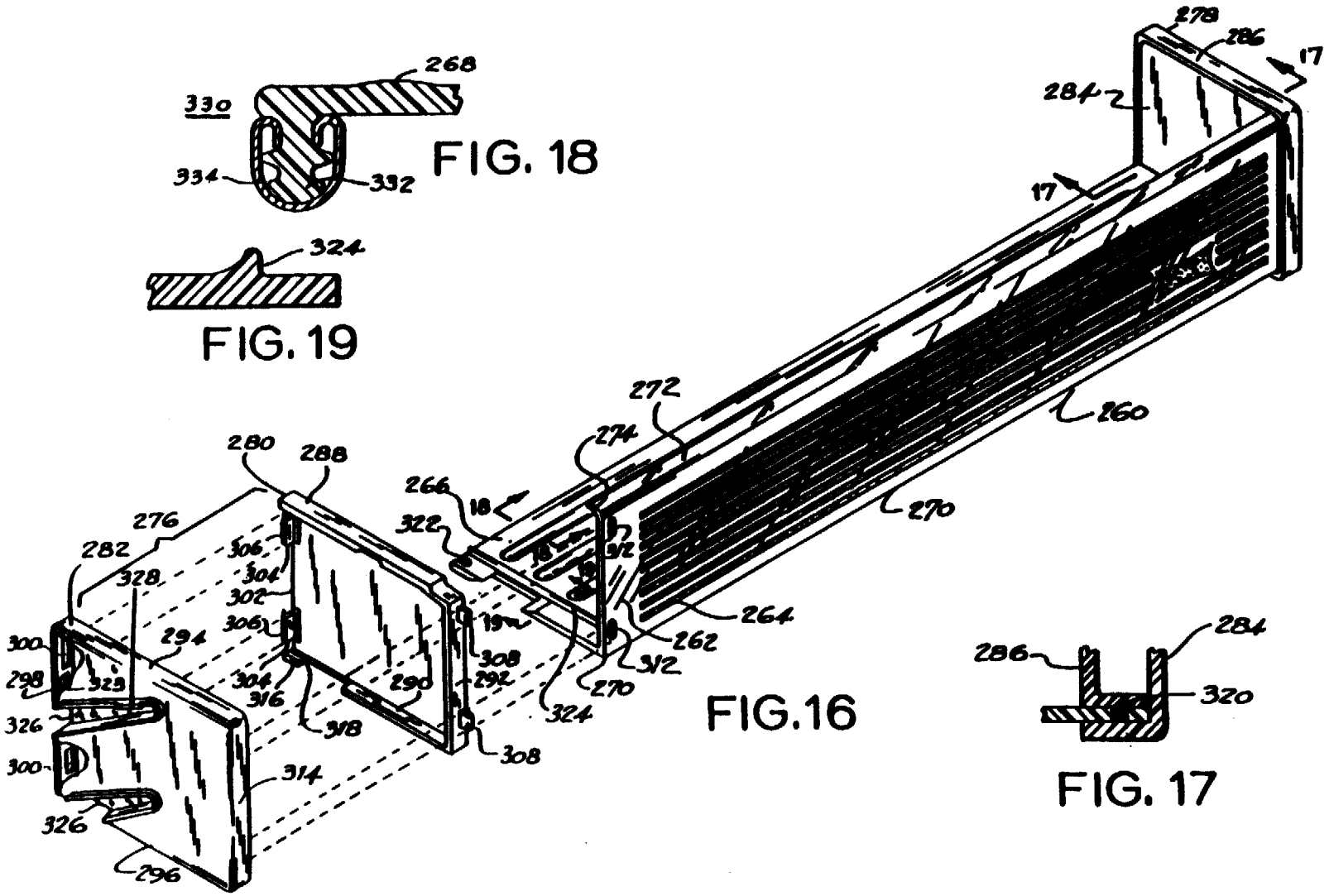
FIG. 16 is a partially exploded, isometric view of a storage shelf useful as a module in accordance with the present invention.
FIG. 17 is a sectional view, taken substantially along the line 17—17 of FIG. 16, here showing a portion of the interlocking nature of components comprising the endwall assembly.
FIG. 18 is a sectional view, taken substantially along the line 18—18 of FIG. 16, here showing a stiffening member and a raised boss for supporting items within the shelf; and, FIG. 19 is a sectional view, taken substantially along the line 19—19 of FIG. 16, showing a spill containing lip on the shelf of FIG. 16.

A second set of mounting tabs 308 project outwardly from the edge of side wall 292. The tabs 308 are sized to extend through slots 312 located on the vertical edge of front face 262. Tabs 308 extend a sufficient distance through slot 312 to engage blind recesses located in the interior of side wall 314 of outer end wall panel 282. A flange 316 forms a portion of bottom wall 290. A locating tab 318 extends downward from the outer face of flange 316 and is best understood by reference to FIG. 17, depicting the tab 320 which secures a portion of end wall assembly 276. Tab 320 is a mirror image of tab 318. Tab 318 engages detent 322 when end wall assembly 276 is mated with body 260.

Assembly is achieved by disposing the locating tabs 308 in the corresponding apertures 312 as well as locating tab 318 in detent 322. Outer end wall panel 282 is placed over inner end panel 280 such that the blind recesses on the interior portion of side wall 282 engage the tips of tabs 308. A compressive force is then applied along side wall 298 forcing tabs 304 to bend inwardly until the reentrant hook registers with the cooperative recesses 300. At that time, the natural resiliency of the tabs returns the same to their normal configuration with the reentrant hooks 306 now lodged firmly in the recesses. An aperture such as aperture 323 is provided to assist in the disassembly of this end wall combination allowing for the introduction of a screwdriver blade or similar instrument which can be used to pry the face or wall 282 slightly away from the mating face 280 so that the hooks are released from the recesses allowing the panel 282 to pivot away from panel 280 about the cooperating tabs and recesses at the opposed side.

Inner end wall panel 280 rests against spill containing lip 324 when the module is fully assembled. Spill containing lip 324 extending along the width of planar shelf 266 at the interface between body 260 and end wall assembly 276. Spill containing lip 324 improves the mechanical interfit between body 260 and end wall assembly 276 and further provides the advantage of preventing spilled liquids from entering the end wall assembly. A sectional view of spill containing lip 324 is shown in FIG. 19.

According to this embodiment of the present invention, tapered fixturing cavities 326 are disposed in an upwardly traverse profile, in fixed vertical increments on the outer face of outer end wall panel 282. A single stabilizing member 328 is disposed at the terminus of tapered fixturing cavity 326. Since this embodiment of the present invention is a shelf having a low profile, a shorter moment renders rotational forces relatively small. Further, since this embodiment of the invention does not include a door, upward rotational forces exerted on the fixturing cavities are relatively slight. Therefore, a single stabilizing member 328 has been found to be sufficient to secure the adjustable shelf in position. Stabilizing member 328 is identical in form and function to stabilizing member 44, being essentially planar at the interface between the tapered fixturing cavities and the tapered fixturing projections. Stabilizing member 328 is retained within the fixturing cavity in a manner which is identical to the scheme described above. Similar tapered fixturing cavities, having complementary geometries are disposed on outer end wall panel 286.

The weight carrying capability of the adjustable shelf is enhanced by a stiffening member which extends laterally along the rear of planar shelf 266 and protrudes downward below planar shelf 266. The stiffening member is best viewed by referring to FIG. 18. Stiffening member 330 includes a raised boss 332, which engages a U-shaped clip 334. When installed, U-shaped clip 334 traverses the entire length of body 260 providing a degree of mechanical rigidity to the adjustable shelf.

While the present invention has been described in detail herein in accord with certain preferred embodiments, many modifications and changes therein may be effected by those skilled in the art. Accordingly it is intended by the appended claims to cover all such modifications and changes as fall within the true spirit and scope of the invention.

What is claimed:

1. A storage module configured for adjustable disposition within a cavity, bounded by opposed side walls, of a refrigerator unit, said module secured therein by fixturing means comprising a spaced array of complementary fixturing projections and fixturing cavities, one of said projections and cavities being formed in said side walls and the other at opposed ends of said module, for selective mating engagement therebetween and positional restraint of said module in a predetermined location within said cavity, and stabilizing means for creating a tribological interface along at least a portion of the mating surfaces between said projections and cavities and restraining said module against dislodgement forces.

2. The storage module of claim 1, wherein said projections and cavities are tapered projections and cavities, tapered in the plane of movement of said module within said cavity and oriented angularly upwardly therein.

3. The storage module of claim 2, wherein each of said projections and cavities includes an upper surface disposed at a first angle in said plane and a lower surface disposed at a second angle in said plane.

4. The storage module of claim 3, wherein said first and second angle are different by up to about 10°.

5. The storage module of claim 4, wherein the angular difference is about 2°.

6. The storage module of claim 2, wherein said stabilizing means comprises at least one discrete stabilizing element in operative association with a selected one of said fixturing means in frictional contact with the other of said fixturing means mating therewith, said element having a coefficient of friction relative to the surface with which it is in contact greater than the coefficient of friction between said projection and cavity outside said tribological interface.

7. The storage module of claim 6, wherein said stabilizing element is an elastomeric element.

8. The storage module of claim 7, wherein each of said projections and cavities includes an upper surface disposed at a first angle and a lower surface disposed at a second angle and is tapered from an open throat toward a terminus, and further wherein said stabilizing element is disposed along the upper surface of the associated fixturing means.

9. The storage module of claim 8, wherein said stabilizing element is disposed in operative engagement with a selected one of said cavities along said upper surface proximate the terminus itself.

10. The storage module of claim 8, wherein said stabilizing element is disposed in operative engagement with a selected one of said cavities along said upper surface proximate the throat thereof.

11. The storage module of claim 8, comprising two of said stabilizing elements, one of each disposed in a selected one of said cavities along the upper surface thereof, the first of said elements proximate the terminus of said cavity and the second of said elements proximate the throat of said cavity.

12. The storage module of claim 11, wherein said first stabilizing element provides a generally uniform interface with said cooperative projection and said second stabilizing element provides a generally ribbed interface with said cooperative projection.

13. The storage module of claim 2, wherein said module is a generally closed module including pivotal door means for access to the interior thereof.

14. The storage module of claim 2, wherein said tapered projections are comprised of an array of generally raised ribs formed in said side walls and said tapered cavities are comprised of an array of generally recessed cells formed in said opposed ends of said module.

15. The storage module of claim 14, wherein each of said ends of said module is comprised of an end wall assembly including an inner end cap and an outer end wall cap mechanically interfitted therewith by releasable interlocking means for joining said caps into said assembly.

16. The storage module of claim 15, wherein said array of cells is formed in said outer end wall cap.

17. The storage module of claim 16, wherein said module is a generally closed, segmented module including pivotal door means for access to the interior thereof.

18. The storage module of claim 17, wherein said module includes first and second door means pivotally disposed about hinge means for movement of said doors about the upper edge thereof, said module further comprising sealing means for monitoring said door means in a normally closed generally sealed configuration.

19. The storage module of claim 18, wherein said array of cells includes three cells for mating disposition with a selected three of said projections, each of said cells being defined within an opposed surface disposed at a first angle, a lower surface disposed at a second angle, an open throat and a terminus, said module further including a first discrete stabilizing element disposed along the upper surface of the uppermost of said cells proximate the terminus thereof and a second discrete stabilizing element disposed along the upper surface of the lowermost of said cells proximate the throat thereof.

20. The storage module of claim 19, wherein said first and second angles differ by an angular value up to about 10°.

21. The storage module of claim 16, wherein said module is a generally open module comprising a shelf with a forward guard panel.

22. The storage module of claim 21, wherein said array of cells includes two cells for mating disposition with a selected pair of said projections, each of said cells being defined within an upper surface disposed at a second angle, an open throat and a terminus, said stabilizing means comprising a discrete stabilizing element disposed along the upper surface of the upper of said cells, proximate the terminus thereof.

23. The storage module of claim 22, wherein said shelf is a generally planar shelf having a plurality of arcuate elements raised from the surface thereof to support items above said surface.

24. The adjustable module of claim 1 wherein said end panels are attached to said body by fastening means integrally molded into said end panels and said body.

25. An adjustable module for disposition within a cavity *in a refrigerator door*, said cavity being bound by opposing side walls having an array of fixturing projection [disposed therein] *formed thereon*, said adjustable module comprising:

(a) a body for storage or retaining items; and (b) end panels attached to opposing ends of said body, said end panels *each* including *a* fixturing [cavities disposed] *cavity formed* on the face thereof, wherein [said] *each* fixturing [cavities each engage] *cavity engages* a [plurality of said] fixturing [projections] *projection* when said adjustable module is placed in said cavity *and* wherein said [fixturing cavities and] fixturing projections are oriented angularly upwardly.

26. The adjustable module of claim 25, wherein said body comprises a compartment.

27. The adjustable module of claim 25, wherein said body comprises a shelf.

28. The adjustable module of claim 25, wherein said fixturing projections are tapered.

29. An adjustable module for disposition within a cavity, said cavity being bounded by opposing side walls having an array of fixturing projections disposed thereon, said adjustable module comprising:

(a) a body for storing or retaining items; and (b) end panels attached to opposing ends of said body, said end panels including fixturing cavities disposed on the face thereof, wherein said fixturing cavities engage a plurality of said fixturing projections when said adjustable module is placed in said cavity, (c) wherein said fixturing projections include top and bottom walls and said fixturing cavities include top and bottom walls which engage the top and bottom walls of said fixturing projections, (d) wherein a stabilizing means is interposed and between the top wall of said fixturing cavity and the top wall of said fixturing projection.

30. The adjustable module of claim 29, wherein said stabilizing means is an elastomeric element retained in said top wall of said fixturing cavity.

* * * * *